(12) United States Patent
Kishikawa

(10) Patent No.: US 11,247,855 B2
(45) Date of Patent: Feb. 15, 2022

(54) TIMING HOPPER AND COMBINATION WEIGHING DEVICE

(71) Applicant: Ishida Co., Ltd., Kyoto (JP)

(72) Inventor: Mikio Kishikawa, Ritto (JP)

(73) Assignee: ISHIDA CO., LTD., Kyoto (JP)

( * ) Notice: Subject to any disclaimer, the term of this patent is extended or adjusted under 35 U.S.C. 154(b) by 60 days.

(21) Appl. No.: 16/983,075

(22) Filed: Aug. 3, 2020

(65) Prior Publication Data

US 2021/0070560 A1 Mar. 11, 2021

(30) Foreign Application Priority Data

Sep. 11, 2019 (JP) .............................. JP2019-165372

(51) Int. Cl.
*B65G 65/40* (2006.01)
*G01G 13/18* (2006.01)
*G01G 19/387* (2006.01)
*B65D 90/54* (2006.01)

(52) U.S. Cl.
CPC ............. *B65G 65/40* (2013.01); *G01G 13/18* (2013.01); *G01G 19/387* (2013.01); *B65D 90/54* (2013.01)

(58) Field of Classification Search
CPC .... G01G 13/18; G01G 19/387; G01G 19/393; B65G 65/40; B65D 90/54
See application file for complete search history.

(56) References Cited

U.S. PATENT DOCUMENTS

| 4,614,243 | A | * | 9/1986 | Ikeda | G01G 19/393 |
| | | | | | 177/1 |
| 9,561,887 | B2 | * | 2/2017 | Kawata | B65D 47/06 |
| 10,466,091 | B2 | * | 11/2019 | Sickinger | G01G 13/242 |

FOREIGN PATENT DOCUMENTS

| EP | 3272661 A1 | 1/2018 |
| EP | 3517905 A1 | 7/2019 |
| JP | 2016132568 A | 7/2016 |

OTHER PUBLICATIONS

The extended European search report issued by the European Patent Office dated Dec. 22, 2020, which corresponds to European Patent Application No. 20189161.1 1001 and is related to U.S. Appl. No. 16/983,075.

* cited by examiner

*Primary Examiner* — Randy W Gibson

(74) *Attorney, Agent, or Firm* — Studebaker & Brackett PC

(57) ABSTRACT

<Problem> It is an object of the present invention to provide a timing hopper that inhibits the occurrence of the problem that articles end up getting stuck inside the timing hopper and are not normally discharged.
<Solution> A timing hopper 9 includes a first member 91, a second member 92, and a gate 9a. The first member 91 has a first opening 91a to which articles A are input. The second member 92 has a second opening 92a from which the articles A are discharged. The gate 9a opens and closes the second opening 92a. The first member 91 has a first side wall 91b and a second side wall 91c. The second side wall 91c opposes the first side wall 91b. The second member 92 has a third side wall 92b and a fourth side wall 92c. The third side wall 92b is continuously connected to the first side wall 91b. The fourth side wall 92c opposes the third side wall 92b and is continuously connected to the second side wall 91c. The height position where the first side wall 91b and the third side wall 92b are interconnected is different from the height position where the second side wall 91c and the fourth side wall 92c are interconnected.

6 Claims, 8 Drawing Sheets

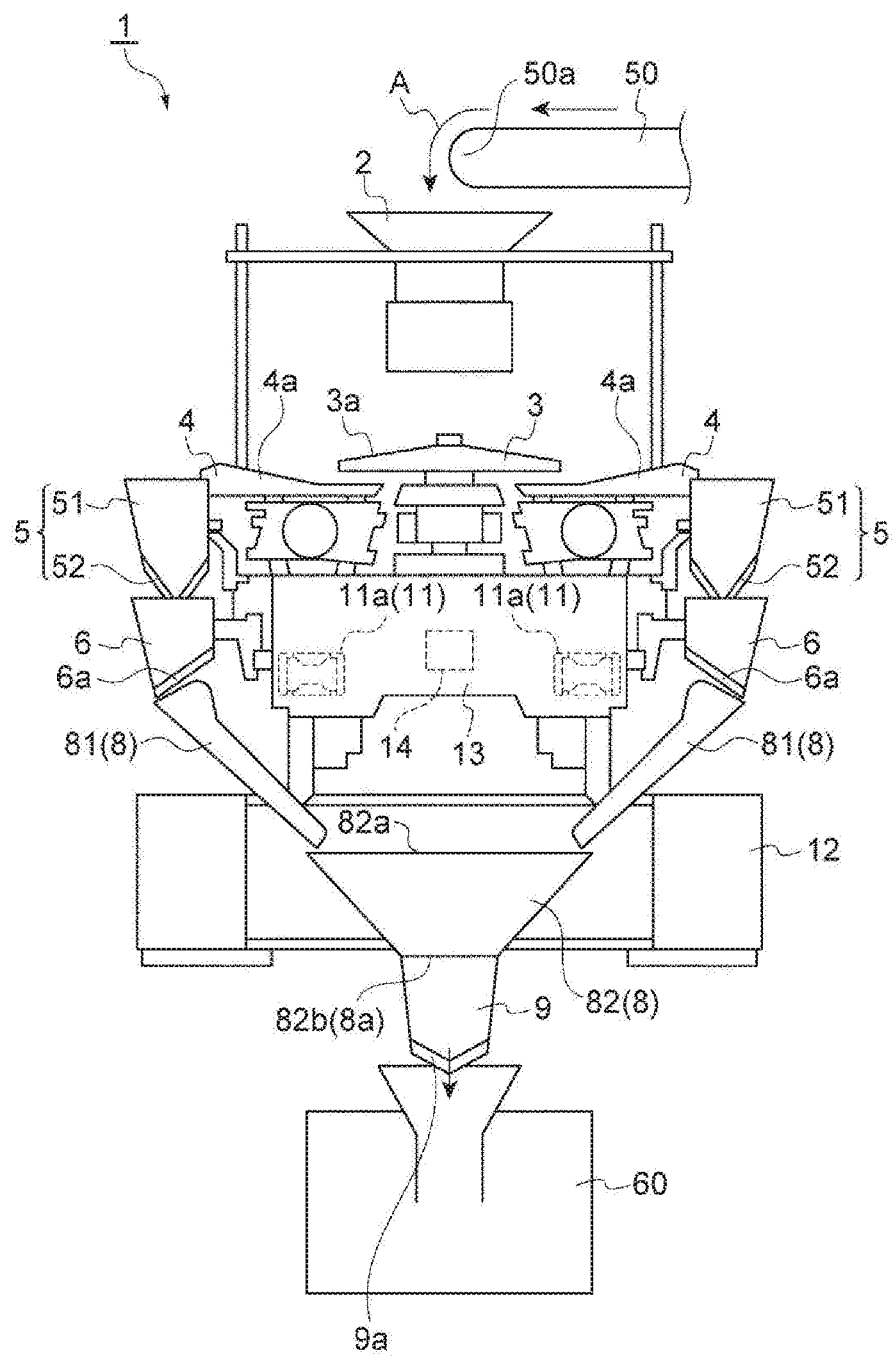
F I G. 1

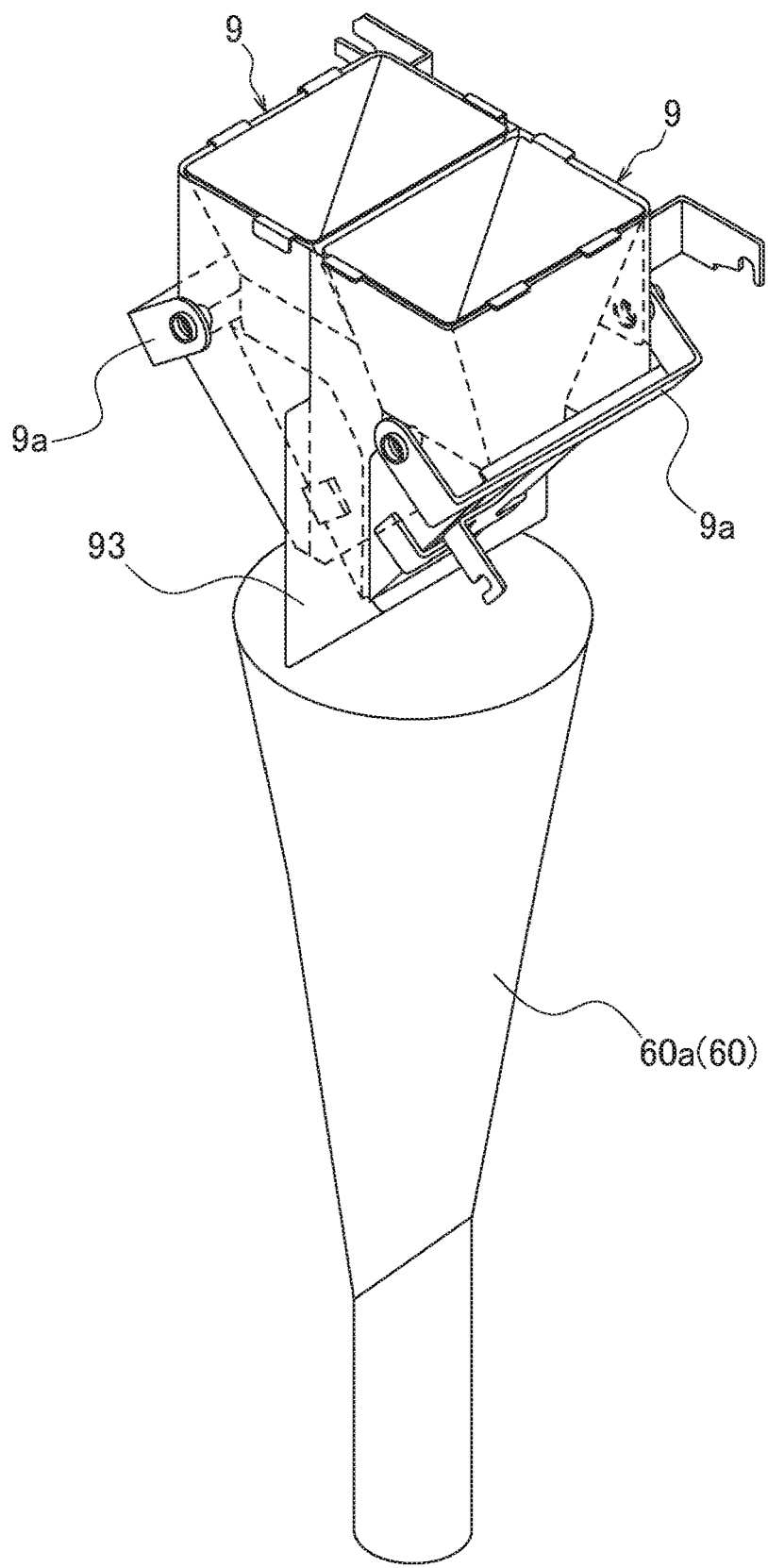
F I G. 2

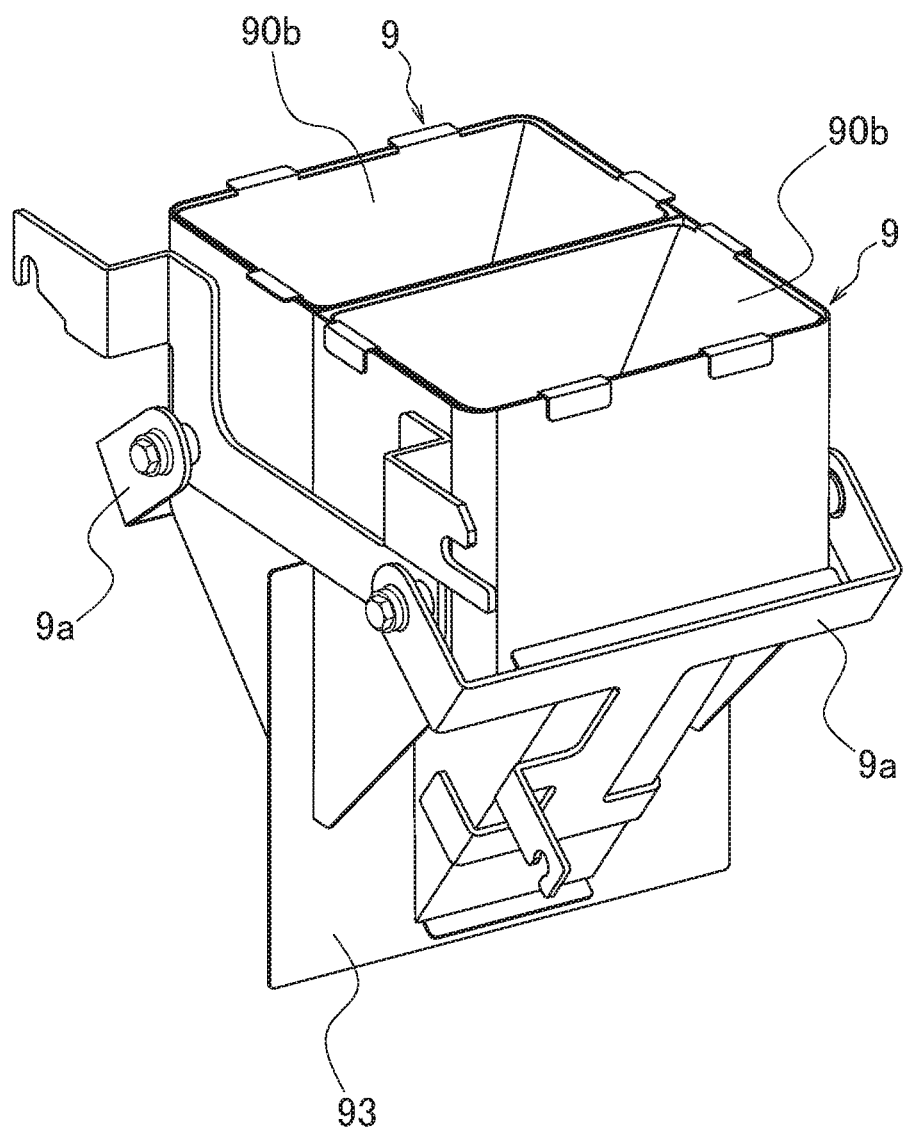
F I G. 3

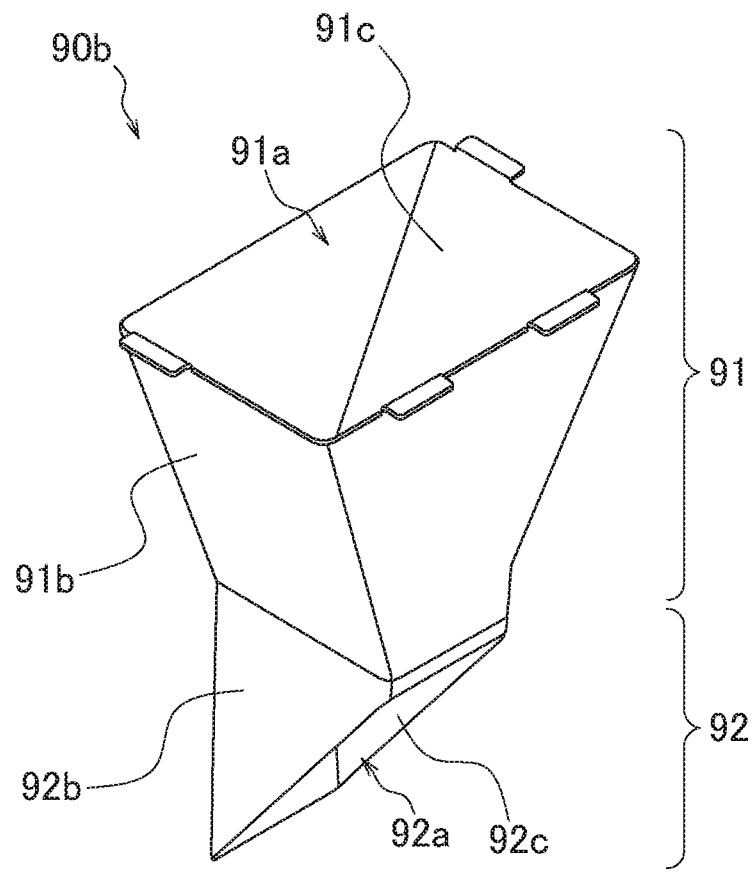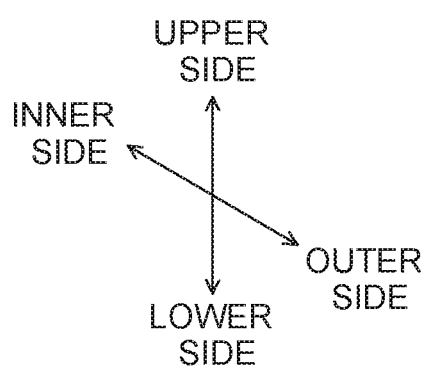
F I G. 4

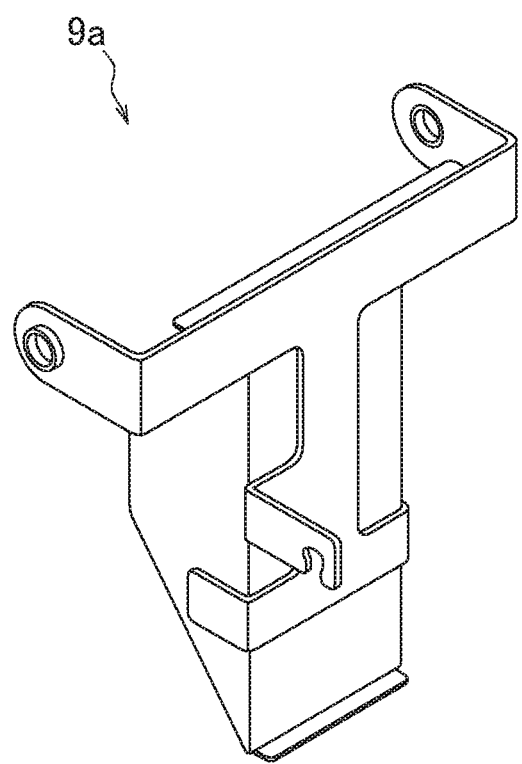
F I G. 5

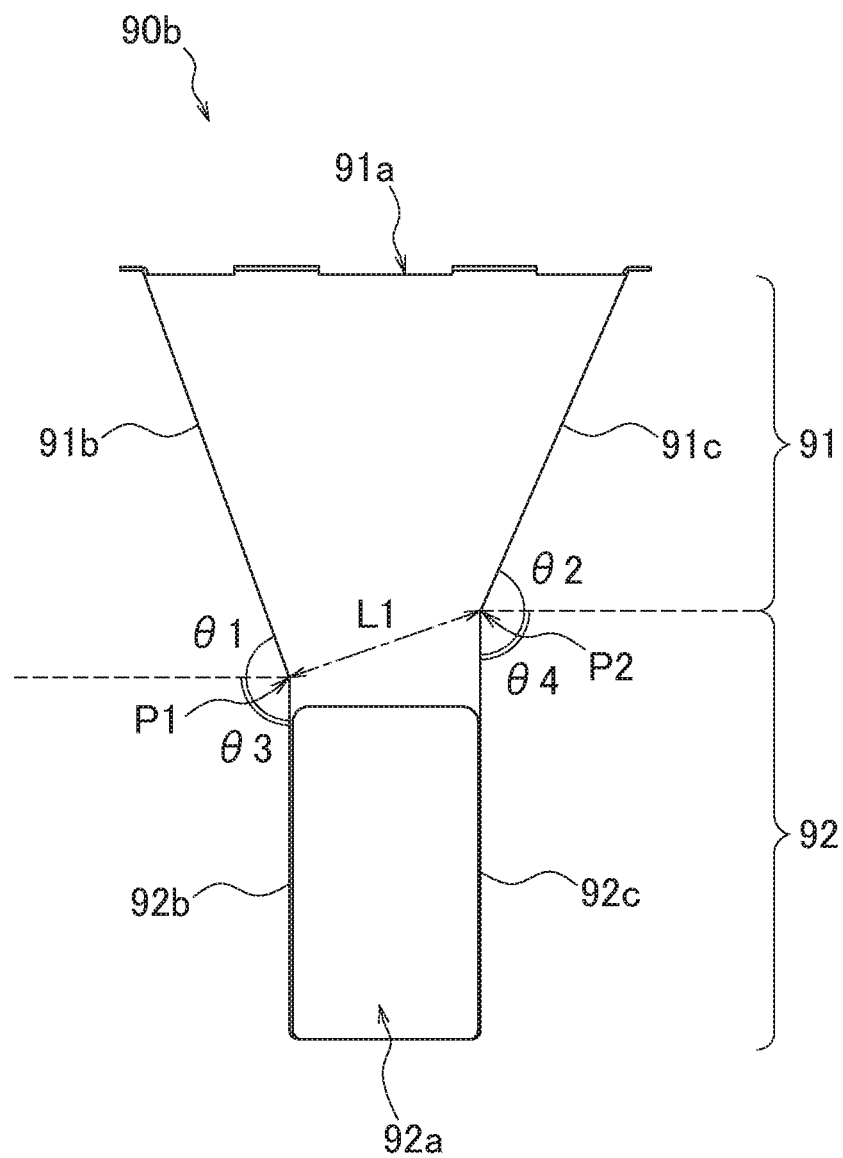
F I G. 6

TIMING HOPPER AND COMBINATION WEIGHING DEVICE

BACKGROUND

Technical Field

The present invention relates to a timing hopper and a combination weighing device that includes the timing hopper.

Related Art

Conventionally, as disclosed in patent document 1 (JP-A No. 2016-132568), a combination weighing device for articles that includes a timing hopper has been known. The timing hopper is a tubular member installed below a collection chute that collects, and discharges downward, articles discharged from a plurality of weigh hoppers. The timing hopper temporarily retains, and discharges downward at a predetermined timing, the articles discharged from the collection chute.

SUMMARY OF INVENTION

Technical Problem

However, in a case where the articles discharged from the collection chute are articles that are relatively large in size, such as block chocolate, sometimes a plurality of the articles end up getting caught inside the timing hopper in a state in which the articles contact each other, such that the articles are not normally discharged. In particular, the articles easily get stuck in the portion of the timing hopper where the angle of the side wall changes. It is an object of the present invention to provide a timing hopper that inhibits the occurrence of the problem that articles end up getting stuck inside the timing hopper and are not normally discharged.

Solution to Problem

A timing hopper pertaining to a first aspect of the invention temporarily retains, and discharges downward at a predetermined timing, articles that have been input thereto from above. The timing hopper includes a tubular first member, a tubular second member, and a gate. The first member has a first opening to which the articles are input. The second member is positioned below the first member, is continuously connected to the first member, and has a second opening from which the articles are discharged. The gate opens and closes the second opening. The first member has a first side wall and a second side wall. The second side wall opposes the first side wall. The second member has a third side wall and a fourth side wall. The third side wall is continuously connected to the first side wall. The fourth side wall opposes the third side wall and is continuously connected to the second side wall. The height position where the first side wall and the third side wall are interconnected is different from the height position where the second side wall and the fourth side wall are interconnected.

This timing hopper can inhibit the occurrence of the problem that articles end up getting stuck inside the timing hopper and are not normally discharged.

A timing hopper pertaining to a second aspect of the invention is the timing hopper pertaining to the first aspect, wherein the second member has a shape where the distance in the horizontal direction between the third side wall and the fourth side wall gradually increases heading downward from above.

A timing hopper pertaining to a third aspect of the invention is the timing hopper pertaining to the second aspect, wherein the second opening has a shape whose dimension in the horizontal direction gradually increases heading downward from above.

A timing hopper pertaining to a fourth aspect of the invention is the timing hopper pertaining to any one of the first to third aspects, wherein the third side wall and the fourth side wall are inclined 0.5° to 15° with respect to the vertical direction.

A timing hopper pertaining to a fifth aspect of the invention is the timing hopper pertaining to any one of the first to fourth aspects, wherein an angle that the first side wall forms with the horizontal direction is smaller than an angle that the third side wall forms with the horizontal direction. An angle that the second side wall forms with the horizonal direction is smaller than an angle that the fourth side wall forms with the horizontal direction.

A combination weighing device pertaining to a sixth aspect of the invention includes a plurality of weigh hoppers, a weighing unit, a control unit, a collection chute, and the timing hopper pertaining to any one of the first to fifth aspects. The weigh hoppers temporarily retain articles. The weighing unit weighs weight values corresponding to the masses of the articles retained in the weigh hoppers. The control unit selects, from a plurality of the weight values that have been weighed by the weighing unit and correlated with each of the weigh hoppers, a combination of the weight values whose combined value becomes a target weight value and causes the weigh hoppers corresponding to the combination that has been selected to discharge the articles. The collection chute collects, and discharges downward, the articles discharged from the weigh hoppers. The articles discharged from the collection chute are input to the timing hopper.

Advantageous Effects of Invention

The timing hopper pertaining to the invention can inhibit the occurrence of the problem that articles end up getting stuck inside the timing hopper and are not normally discharged.

BRIEF DESCRIPTION OF DRAWINGS

FIG. 1 shows the configuration of a combination weighing device 1 of an embodiment;

FIG. 2 shows the positional relationship between timing hoppers 9 and a bag-making and packaging machine 60;

FIG. 3 is a perspective view of the timing hoppers 9;

FIG. 4 is a perspective view of a hopper body 90b;

FIG. 5 is a perspective view of a gate 9a;

FIG. 6 shows the hopper body 90b viewed along the horizontal direction from the side of a second opening 92a;

FIG. 8 shows the hopper body 90b of example modification A viewed along the horizontal direction from the side of the second opening 92a.

DETAILED DESCRIPTION

Figure 7:
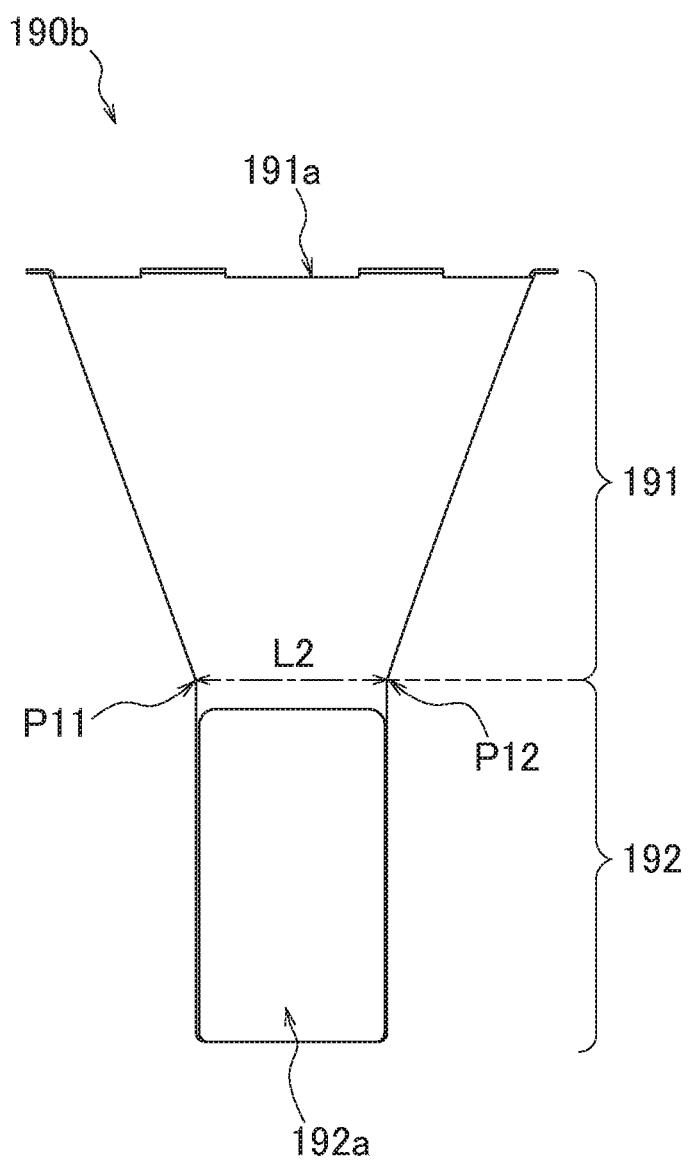
FIG. 7 is a side view of a tubular hopper body 190b of a conventional timing hopper serving as a reference drawing.

An embodiment of the invention will be described with reference to the drawings. The embodiment described below is a specific example of the invention and is not intended to limit the technical scope of the invention.

(1) OVERALL CONFIGURATION OF COMBINATION WEIGHING DEVICE 1

FIG. 1 shows the configuration of a combination weighing device 1 pertaining to the embodiment. The combination weighing device 1 mainly has an input chute 2, a dispersion feeder 3, a plurality of radial feeders 4, a plurality of pool hoppers 5, a plurality of weigh hoppers 6, a collection chute 8, timing hoppers 9, a weighing unit 11, and a control unit 14. Above the combination weighing device 1 is installed a transport conveyor 50. Below the combination weighing device 1 is installed a bag-making and packaging machine 60.

The combination weighing device 1 weighs articles A so that weight values corresponding to the masses of the articles A supplied by the transport conveyor 50 become a predetermined target weight value. The weight values are, for example, the weights of the articles A. The combination weighing device 1 supplies the articles A it has weighed to the bag-making and packaging machine 60. The bag-making and packaging machine 60 bag-packs the articles A supplied from the combination weighing device 1 while forming a film into bags with a predetermined capacity. The articles A are articles whose mass varies per individual article, such as agricultural products, marine products, and processed foods.

The input chute 2 is disposed below a transport terminus 50a of the transport conveyor 50. The input chute 2 receives, and discharges downward, the articles A that have been transported from outside by the transport conveyor 50 and have dropped from the transport terminus 50a of the transport conveyor 50.

The dispersion feeder 3 is disposed below the input chute 2. The dispersion feeder 3 has a conical transport surface 3a that broadens heading downward. By vibrating the transport surface 3a, the dispersion feeder 3 uniformly transports, to the outer edge of the transport surface 3a, the articles A discharged from the input chute 2 to the top portion of the transport surface 3a.

The plurality of radial feeders 4 are radially disposed along the outer edge of the transport surface 3a of the dispersion feeder 3. Each radial feeder 4 has a trough 4a that extends outward from below the outer edge of the transport surface 3a. By vibrating the troughs 4a, the radial feeders 4 transport, to the distal end portions of the troughs 4a, the articles A discharged from the outer edge of the transport surface 3a.

The plurality of pool hoppers 5 are radially disposed from the center of the combination weighing device 1 when the combination weighing device 1 is viewed along the vertical direction. The pool hoppers 5 are disposed below the distal end portions of the troughs 4a of each of the radial feeders 4. Each pool hopper 5 has a body 51 and a gate 52. The body 51 has an upper opening to which the articles A are input and a lower opening from which the articles A are discharged. The gate 52 is a member capable of opening and closing the lower opening of the body 51. The pool hoppers 5 temporarily retain the articles A discharged from the distal end portions of the troughs 4a and discharge downward the articles A they have temporarily retained in the bodies 51.

The plurality of weigh hoppers 6 are radially disposed from the center of the combination weighing device 1 when the combination weighing device 1 is viewed along the vertical direction. The weigh hoppers 6 are disposed below each of the pool hoppers 5. Each weigh hopper 6 has a gate 6a capable of opening and closing an opening in the bottom portion thereof. By closing with the gates 6a the openings in the bottom portions, the weigh hoppers 6 temporarily retain the articles A discharged from the corresponding pool hoppers 5. By opening with the gates 6a the openings in the bottom portions, the weigh hoppers 6 discharge downward the articles A they have temporarily retained.

The collection chute 8 collects, in a discharge opening 8a, the articles A discharged from the weigh hoppers 6. The discharge opening 8a is positioned below the plurality of weigh hoppers 6 and is positioned in the center when the combination weighing device 1 is viewed along the vertical direction. The collection chute 8 has upstream chute portions 81 and a downstream chute portion 82. The upstream chute portions 81 receive the articles A discharged from each of the weigh hoppers 6 and allow the articles A to slide toward the discharge opening 8a. The downstream chute portion 82 is a truncated cone-shaped tube that narrows heading downward, and has an upper opening 82a and a lower opening 82b. The downstream chute portion 82 uses the lower opening 82b as the discharge opening 8a to discharge the articles A downward from the discharge opening 8a.

The timing hoppers 9 are disposed below the discharge opening 8a. The timing hoppers 9 each have a gate 9a capable of opening and closing an opening in the bottom portion thereof. By closing with the gates 9a the openings in the bottom portions, the timing hoppers 9 temporarily retain the articles A discharged from the collection chute 8. By opening with the gates 9a the openings in the bottom portions, the timing hoppers 9 discharge the articles A they have temporarily retained to the bag-making and packaging machine 60.

The weighing unit 11 is disposed in a case 13 that is supported by a frame 12. The weighing unit 11 has a plurality of load cells 11a. Each load cell 11a supports the corresponding weigh hopper 6. The weighing unit 11 weighs weight values corresponding to the masses of the articles A when the articles A are temporarily retained in each of the weigh hoppers 6.

The control unit 14 is a computer disposed in the case 13. The control unit 14 mainly has a CPU, a ROM, a RAM, and an auxiliary storage device (e.g., an HDD or an SSD). The control unit 14 controls the operations of each part of the combination weighing device 1, such as the transport operations of the dispersion feeder 3 and the radial feeders 4, the opening and closing operations of the gates 52 of each of the pool hoppers 5, the opening and closing operations of the gates 6a of each of the weigh hoppers 6, and the opening and closing operations of the gates 9a of the timing hoppers 9. The control unit 14 is communicably connected to the bag-making and packaging machine 60.

The control unit 14 correlates, and stores, the weight values weighed by the weighing unit 11 with the weigh hoppers 6 retaining the articles A corresponding to the weight values. The control unit 14 selects, from a plurality of the weight values weighed by the weighing unit 11 and correlated with each of the weigh hoppers 6, a combination of weight values whose combined value becomes the target weight value. More specifically, the control unit 14 selects, from a plurality of the weight values output by the weighing unit 11, a combination of weight values whose combined value falls within a predetermined range whose lower limit value is the target weight value. The control unit 14 causes the weigh hoppers 6 corresponding to the combination of weight values to discharge the articles A.

The input chute 2, the dispersion feeder 3, the plurality of radial feeders 4, the plurality of pool hoppers 5, and the plurality of weigh hoppers 6 are directly or indirectly supported by the case 13. The collection chute 8 and the timing hoppers 9 are directly or indirectly supported by the frame 12.

(2) CONFIGURATION OF TIMING HOPPERS 9

The combination weighing device 1 has two timing hoppers 9. FIG. 2 shows the positional relationship between the two timing hoppers 9 of the combination weighing device 1 and the bag-making and packaging machine 60. In FIG. 2, a former 60a of the bag-making and packaging machine 60 is shown. The two timing hoppers 90 are disposed facing mutually opposite directions, with a partition plate 93 interposed between them. Principal faces of the partition plate 93 are perpendicular to the horizontal plane. The former 60a is a tubular member through which pass the articles A discharged from either one of the two timing hoppers 9. The control unit 4 performs control that opens and closes, at an appropriate timing, the gate 9a of either one of the timing hoppers 9 retaining the articles A to input the articles A to the inside of the former 60a. In the following description, when the combination weighing device 1 is viewed along the vertical direction, the center side of the combination weighing device 1 will be called the "inner side" and the outer edge side of the combination weighing device 1 will be called the "outer side" (see FIG. 4).

FIG. 3 is a perspective view of the timing hoppers 9. In FIG. 3, the two timing hoppers 9 are shown from an angle different from that of FIG. 2. The timing hoppers 9 each include a tubular hopper body 90b and a gate 9a. The articles A discharged from the collection chute 8 pass downward from above through the hopper body 90b.

FIG. 4 is a perspective view of the hopper body 90b. FIG. 5 is perspective view of the gate 9a. The hopper body 90b is configured from a tubular first member 91 and a tubular second member 92. The first member 91 and the second member 92 are continuously interconnected in the up and down direction.

The first member 91 has a first opening 91a to which the articles A are input. The first opening 91a is positioned in the upper end portion of the first member 91. The first opening 91a has a substantially quadrilateral shape parallel to the horizontal plane. The first member 91 has a first side wall 91b and a second side wall 91c. The second side wall 91c opposes the first side wall 91b.

The second member 92 is positioned below the first member 91 and is continuously connected to the first member 91. In other words, the upper end portion of the second member 92 is continuously connected to the lower end portion of the first member 91. The second member 92 has a second opening 92a from which the articles A are discharged. The second opening 92a is the lower end portion of the second member 92. The second opening 92a has a substantially quadrilateral shape that is inclined with respect to the horizontal plane. The second member 92 has a third side wall 92b and a fourth side wall 92c. The fourth side wall 92c opposes the third side wall 92b.

FIG. 6 shows the hopper body 90b viewed along the horizontal direction from the side of the second opening 92a. The second opening 92a is inclined with respect to the horizonal plane so that it becomes positioned from the outer side to the inner side heading downward (the lower side) from above (the upper side) in the vertical direction (see FIG. 4). In FIG. 6, the first opening 91a is positioned between the first side wall 91b and the second side wall 91c, and the second opening 92a is positioned between the third side wall 92b and the fourth side wall 92c. As shown in FIG. 3, the horizontal direction distance between the two second openings 92a becomes shorter heading downward from above in the vertical direction. The partition plate 93 extends a predetermined distance even further downward from the lower end portions of the two second openings 92a.

The third side wall 92b of the second member 92 is continuously connected to the first side wall 91b of the first member 91. Specifically, the lower end portion of the first side wall 91b is continuously connected at a first connection point P1 to the upper end portion of the third side wall 92b.

The fourth side wall 92c of the second member 92 is continuously connected to the second side wall 91c of the first member 91. Specifically, the lower end portion of the second side wall 91c is continuously connected at a second connection point P2 to the upper end portion of the fourth side wall 92c.

As shown in FIG. 6, the height position of the first connection point P1 is different from the height position of the second connection point P2. Specifically, the height position of the second connection point P2 is positioned higher than the height position of the first connection point P1.

A first angle $\theta 1$ that the first side wall 91b forms with the horizontal direction is smaller than a third angle $\theta 3$ that the third side wall 92b forms with the horizontal direction. A second angle $\theta 2$ that the second side wall 91c forms with the horizontal direction is smaller than a fourth angle $\theta 4$ that the fourth side wall 92c forms with the horizontal direction. The first angle $\theta 1$ and the second angle $\theta 2$ are 40° to 85° for example, and the third angle $\theta 3$ and the fourth angle $\theta 4$ are about 90°.

For that reason, the angles of the side walls of the timing hopper 90 change at the first connection point P1 and the second connection point P2 heading downward from above in the vertical direction. Specifically, the angle of the side wall comprising the first side wall 91b and the third side wall 92b changes at the first connection point P1, and the angle of the side wall comprising the second side wall 91c and the fourth side wall 92c changes at the second connection point P2.

The gate 9a is attached to the hopper body 90b. The gate 9a has a mechanism capable of moving so as to open and close the second opening 92a. While the gate 9a closes the second opening 92a, the articles A retained inside the hopper body 90b are not discharged downward from the second opening 92a. While the gate 9a opens the second opening 92a, the articles A retained inside the hopper body 90b are discharged downward from the second opening 92a.

(3) CHARACTERISTICS

The articles A discharged from the collection chute 8 pass through the first opening 91a of the timing hopper 9 and enter the first member 91. The articles A fall through the first member 91 and enter the second member 92. In a case where the second opening 92a is closed by the gate 9a, the articles A are temporarily retained in the hopper body 90b without being discharged from the second opening 92a of the timing hopper 9. When the gate 9a moves so that the second opening 92a is no longer closed by the gate 9a, the articles A are discharged from the second opening 92a and input to the inside of the former 60a.

FIG. 7 is a side view of a tubular hopper body 190b of a conventional timing hopper serving as a reference drawing. FIG. 7 is a drawing viewed from the same direction as that of FIG. 6. The hopper body 190b is configured from a tubular first member 191 and a tubular second member 192. The first member 191 has a first opening 191a to which the articles A are input. The second member 192 has a second opening 192a from which the articles A are discharged. The second member 192 is positioned below the first member 191 and is continuously connected to the first member 191. The hopper body 190b has connection points P11 and P12 where the first member 191 and the second member 192 are continuously connected. As shown in FIG. 7, the connection points P11 and P12 are places where the angles of the side walls of the hopper body 190b change heading downward from above in the vertical direction. For that reason, the connection points P11 and P12 of the hopper body 190b of FIG. 7 correspond to the first connection point P1 and the second connection point P2, respectively, of the hopper body 90b of the embodiment. The height positions of the connection points P11 and P12 are constant around the hopper body 190b.

However, the first connection point P1 and the second connection point P2 of the hopper body 90b of the embodiment are in mutually different height positions. For that reason, in a case where the dimensions of the hopper body 90b of the embodiment and the dimensions of the conventional hopper body 190b are about the same, a distance L1 between the first connection point P1 and the second connection point P2 in FIG. 6 is longer than a distance L2 between the connection point P11 and the connection point P12 in FIG. 7. In other words, in the timing hopper 9 of the embodiment, the distance L1 between the first connection point P1 and the second connection point P2 can be increased compared to the conventional timing hopper.

In the conventional timing hopper, the distance L2 in FIG. 7 cannot be sufficiently ensured. For that reason, in a case where the articles A are articles that are relatively large in size, such as block chocolate, a plurality of the articles A easily get caught inside the hopper body 190b in a state in which the articles A contact each other. In particular, the articles A easily get stuck in the neighborhood of the connection points P11 and P12 where the angles of the side walls of the timing hopper change.

In the timing hopper 9 of the embodiment, the distance L1 between the first connection point P1 and the second connection point P2 where the angles of the side walls change can be sufficiently ensured compared to the conventional timing hopper. For that reason, a situation where a plurality of the articles A end up getting caught inside the hopper body 90b in a state in which the articles A contact each other, such that the articles A are not normally discharged, is inhibited. Consequently, the timing hopper 9 can inhibit the occurrence of the problem that the articles A end up getting stuck inside the timing hopper 9 and are not normally discharged.

(4) EXAMPLE MODIFICATIONS

An embodiment of the invention has been described above, but the invention is not limited to the above embodiment, and various changes may be made thereto without departing from the scope of the invention. For example, at least one of the example modifications described next can be applied to the invention.

(4-1) Example Modification A

In the timing hopper 9 of the embodiment, the second member 92 may also have a shape where the distance in the horizontal direction between the third side wall 92b and the fourth side wall 92c gradually increases heading downward from above in the vertical direction. That is, the second opening 92a may also have a tapered shape whose dimension in the horizontal direction gradually increases heading downward from above.

Figure 8:
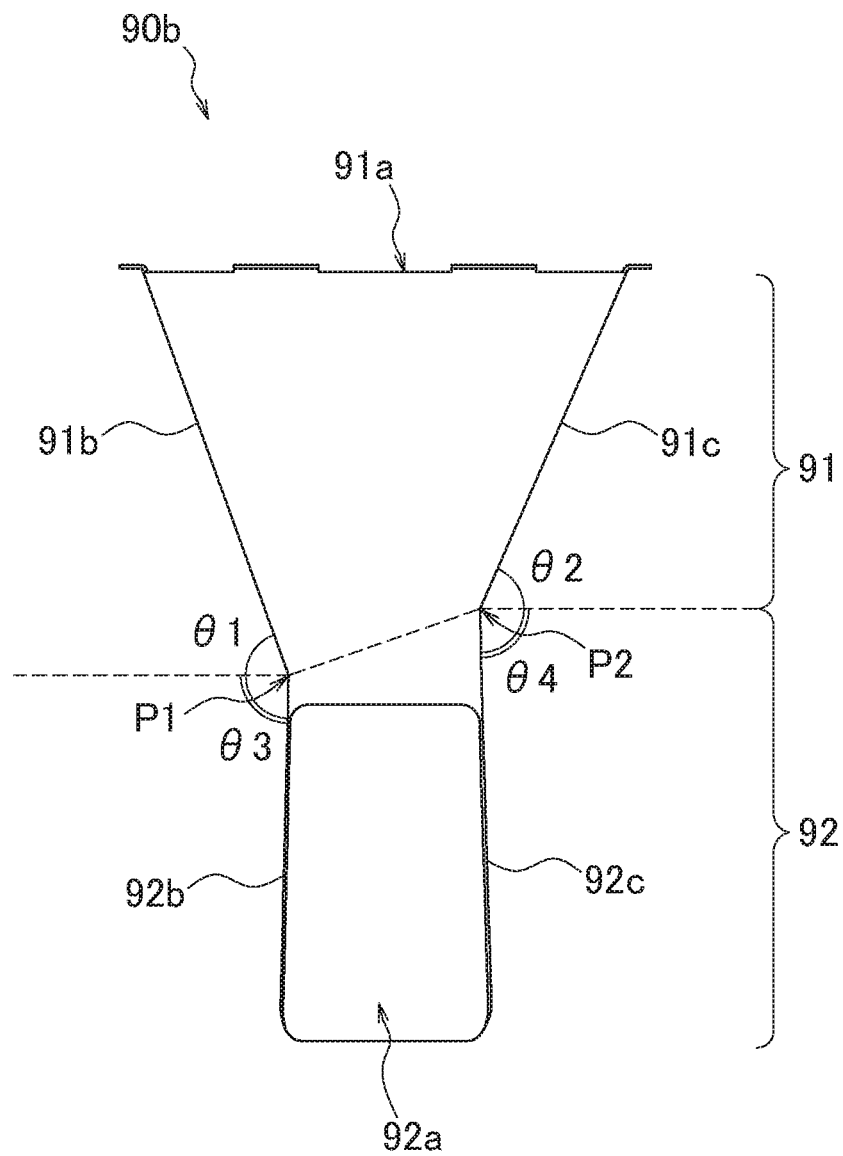

FIG. 8 shows the hopper body 90b in this example modification viewed along the horizontal direction from the side of the second opening 92a. As shown in FIG. 8, the distance in the horizontal direction between the third side wall 92b and the fourth side wall 92c gradually increases heading downward from above in the vertical direction. Furthermore, the horizontal direction dimension of the second opening 92a also gradually increases heading downward from above in the vertical direction.

In this example modification, the horizontal direction dimension of the second opening 92a can be sufficiently ensured, so a situation where a plurality of the articles A end up getting caught inside the second member 92 of the hopper body 90b in a state in which the articles A contact each other, such that the articles A are not normally discharged, is inhibited.

(4-2) Example Modification B

In the timing hopper 9 of the embodiment, the third side wall 92b and the fourth side wall 92c may also be inclined with respect to the vertical direction. Specifically, the third side wall 92b and the fourth side wall 92c may also be inclined 0.5° to 15° with respect to the vertical direction. In this case, the third angle θ3 and the fourth angle θ4 are 75° to 89.5° (see FIG. 8).

In this example modification, it is preferred that the third side wall 92b and the fourth side wall 92c be inclined in such a way that the distance in the horizontal direction between the third side wall 92b and the fourth side wall 92c gradually increases heading downward from above in the vertical direction. Because of this, as described in example modification A, a situation where a plurality of the articles A end up getting caught inside the second member 92 of the hopper body 90b in a state in which the articles A contact each other, such that the articles A are not normally discharged, is inhibited.

INDUSTRIAL APPLICABILITY

The timing hopper pertaining to the invention can inhibit the occurrence of the problem that articles end up getting stuck inside the timing hopper and are not normally discharged.

REFERENCE SIGNS LIST

1 Combination Weighing Device
6 Weigh Hoppers
8 Collection Chute
9 Timing Hopper
9a Gate
11 Weighing Unit
14 Control Unit
91 First Member
91a First Opening
91b First Side Wall
91c Second Side Wall
92 Second Member
92a Second Opening 92b Third Side Wall
92c Fourth Side Wall
A Articles

CITATION LIST

Patent Literature

Patent Document 1: JP-A No. 2016-132568

What is claimed is:

1. A timing hopper that temporarily retains, and discharges downward at a predetermined timing, articles that have been input thereto from above, the timing hopper comprising:
    a tubular first member that has a first opening to which the articles are input;
    a tubular second member that is positioned below the first member, is continuously connected to the first member, and has a second opening from which the articles are discharged; and
    a gate that opens and closes the second opening,
    wherein
    the first member has
       a first side wall and
       a second side wall that opposes the first side wall,
    the second member has
       a third side wall that is continuously connected to the first side wall and
       a fourth side wall that opposes the third side wall and is continuously connected to the second side wall, and
    the height position where the first side wall and the third side wall are interconnected is different from the height position where the second side wall and the fourth side wall are interconnected.

2. The timing hopper according to claim 1, wherein the second member has a shape where the distance in the horizontal direction between the third side wall and the fourth side wall gradually increases heading downward from above.

3. The timing hopper according to claim 2, wherein the second opening has a shape whose dimension in the horizontal direction gradually increases heading downward from above.

4. The timing hopper according to claim 1, wherein the third side wall and the fourth side wall are inclined 0.5° to 15° with respect to the vertical direction.

5. The timing hopper according to claim 1, wherein
    an angle that the first side wall forms with the horizontal direction is smaller than an angle that the third side wall forms with the horizontal direction, and
    an angle that the second side wall forms with the horizontal direction is smaller than an angle that the fourth side wall forms with the horizontal direction.

6. A combination weighing device comprising:
    a plurality of weigh hoppers that temporarily retain articles;
    a weighing unit that weighs weight values corresponding to the masses of the articles retained in the weigh hoppers;
    a control unit that selects, from a plurality of the weight values that have been weighed by the weighing unit and correlated with each of the weigh hoppers, a combination of the weight values whose combined value becomes a target weight value and causes the weigh hoppers corresponding to the combination that has been selected to discharge the articles;
    a collection chute that collects, and discharges downward, the articles discharged from the weigh hoppers; and
    the timing hopper according to claim 1, to which the articles discharged from the collection chute are input.

* * * * *